April 12, 1932. S. P. TOWNSEND 1,853,244
LAWN MOWER
Filed Oct. 3, 1927 18 Sheets-Sheet 1

Inventor;
Samuel P. Townsend,
by his Attorneys
Howson & Howson

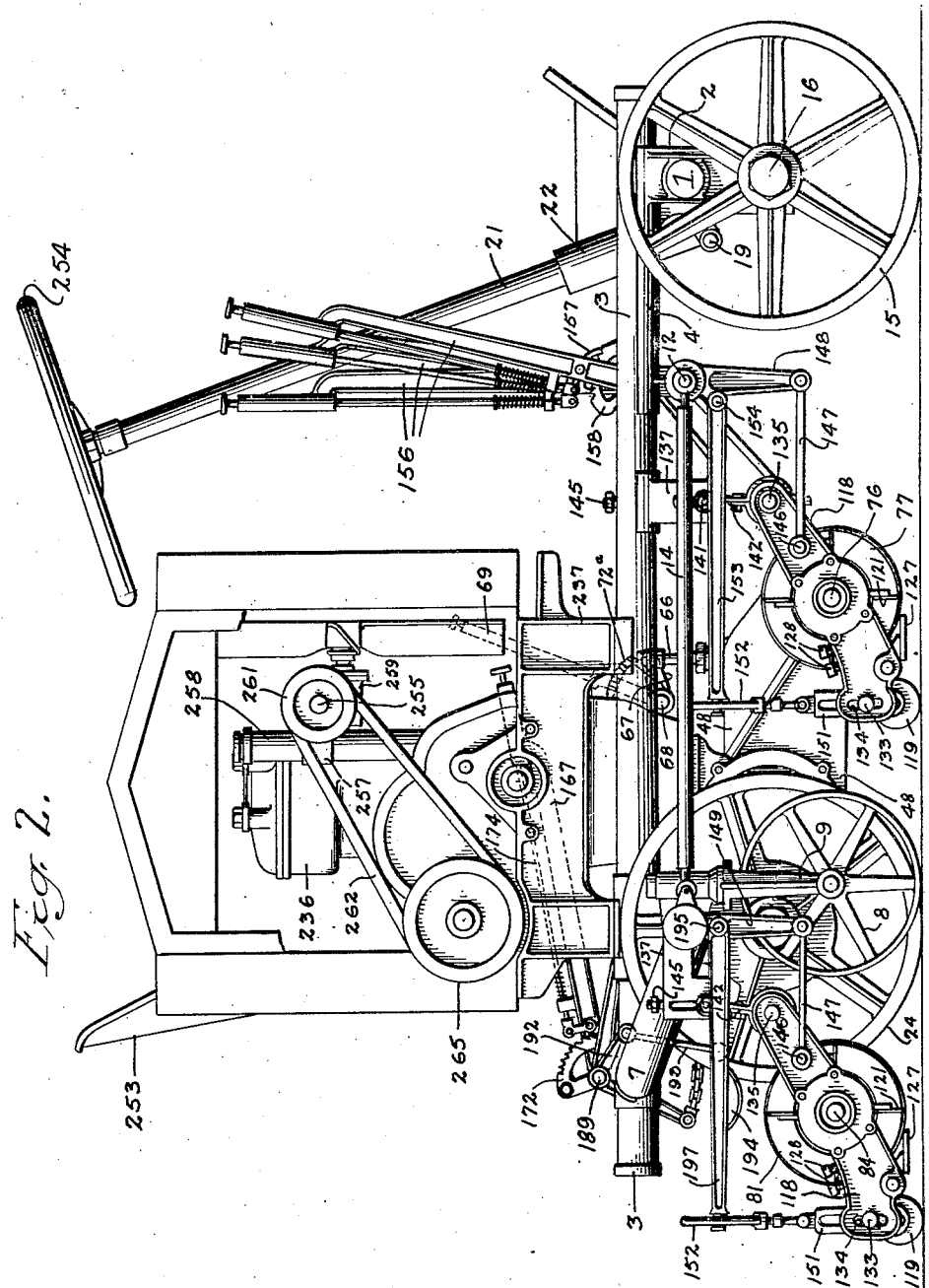

April 12, 1932. S. P. TOWNSEND 1,853,244
LAWN MOWER
Filed Oct. 3, 1927 18 Sheets-Sheet 3
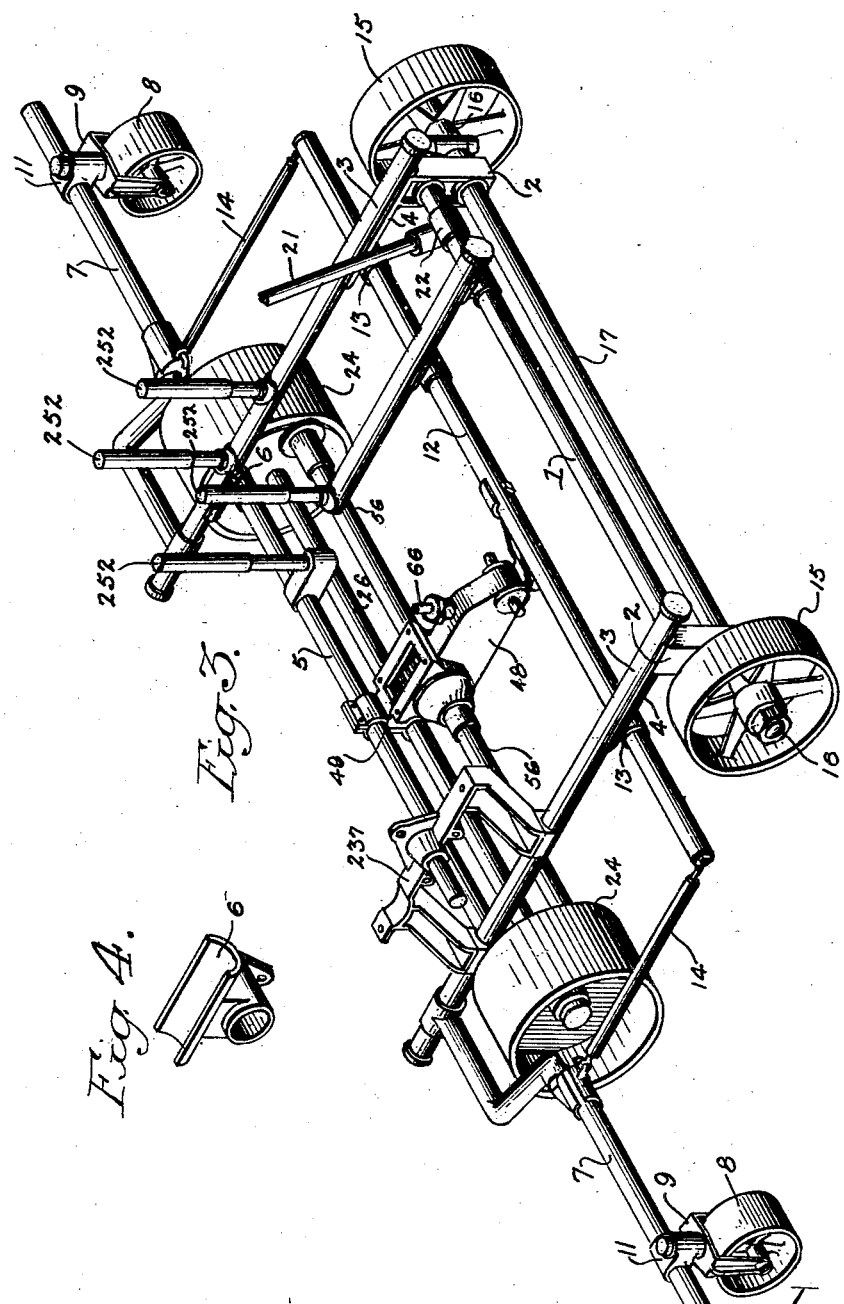

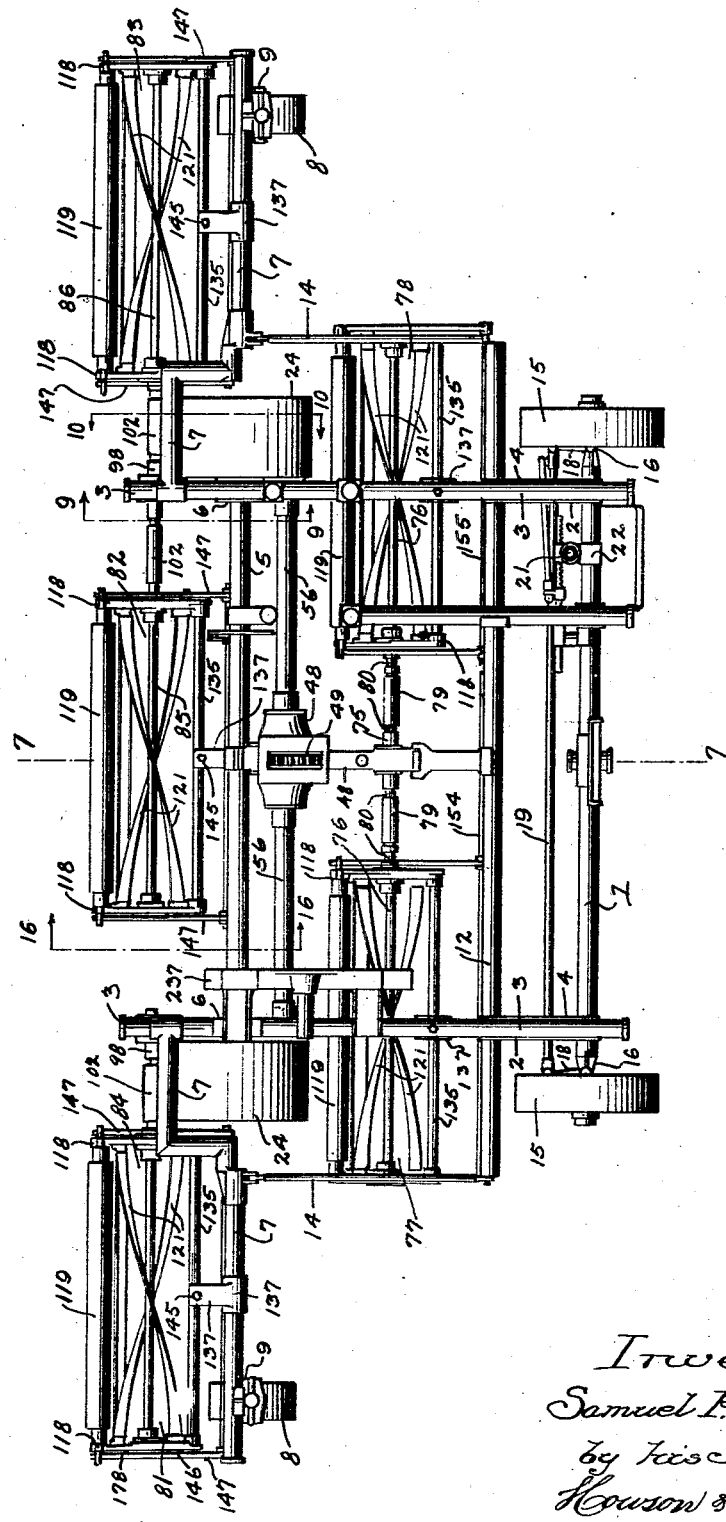

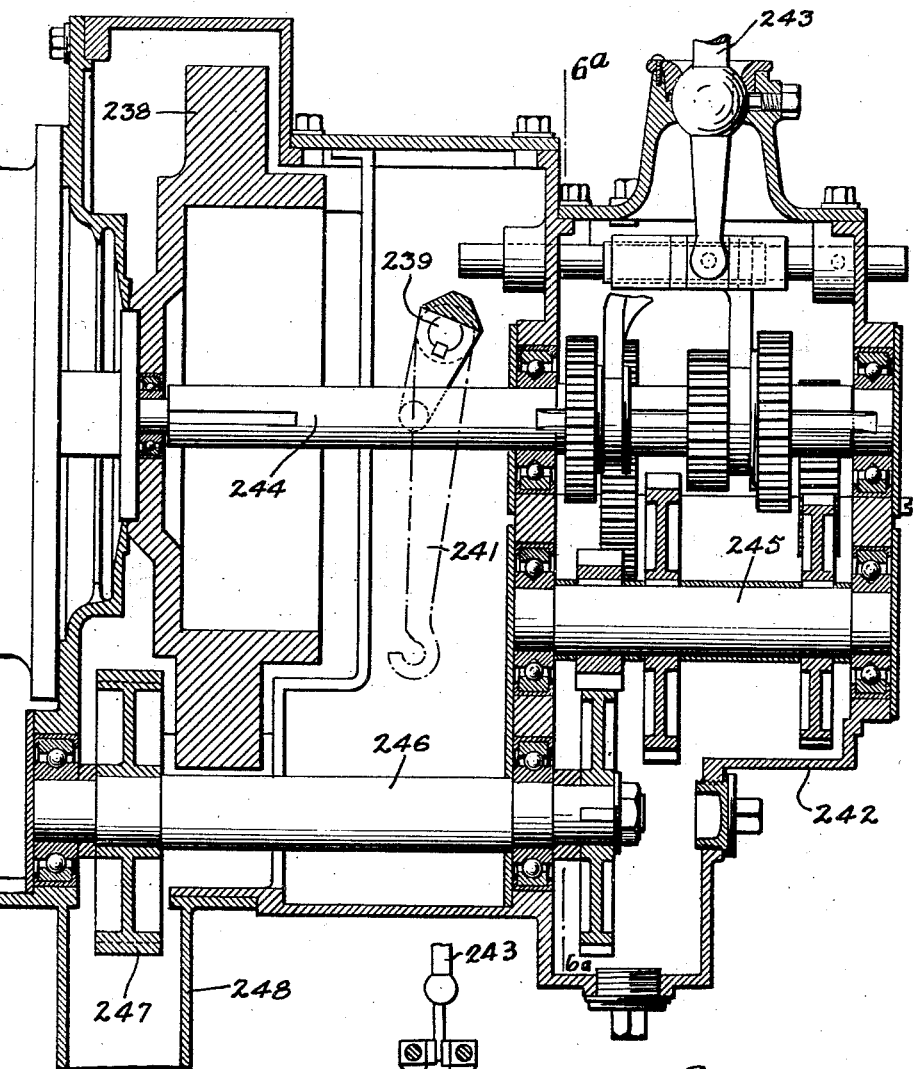
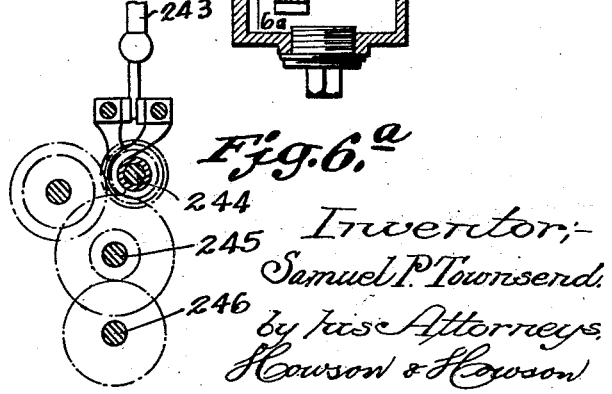

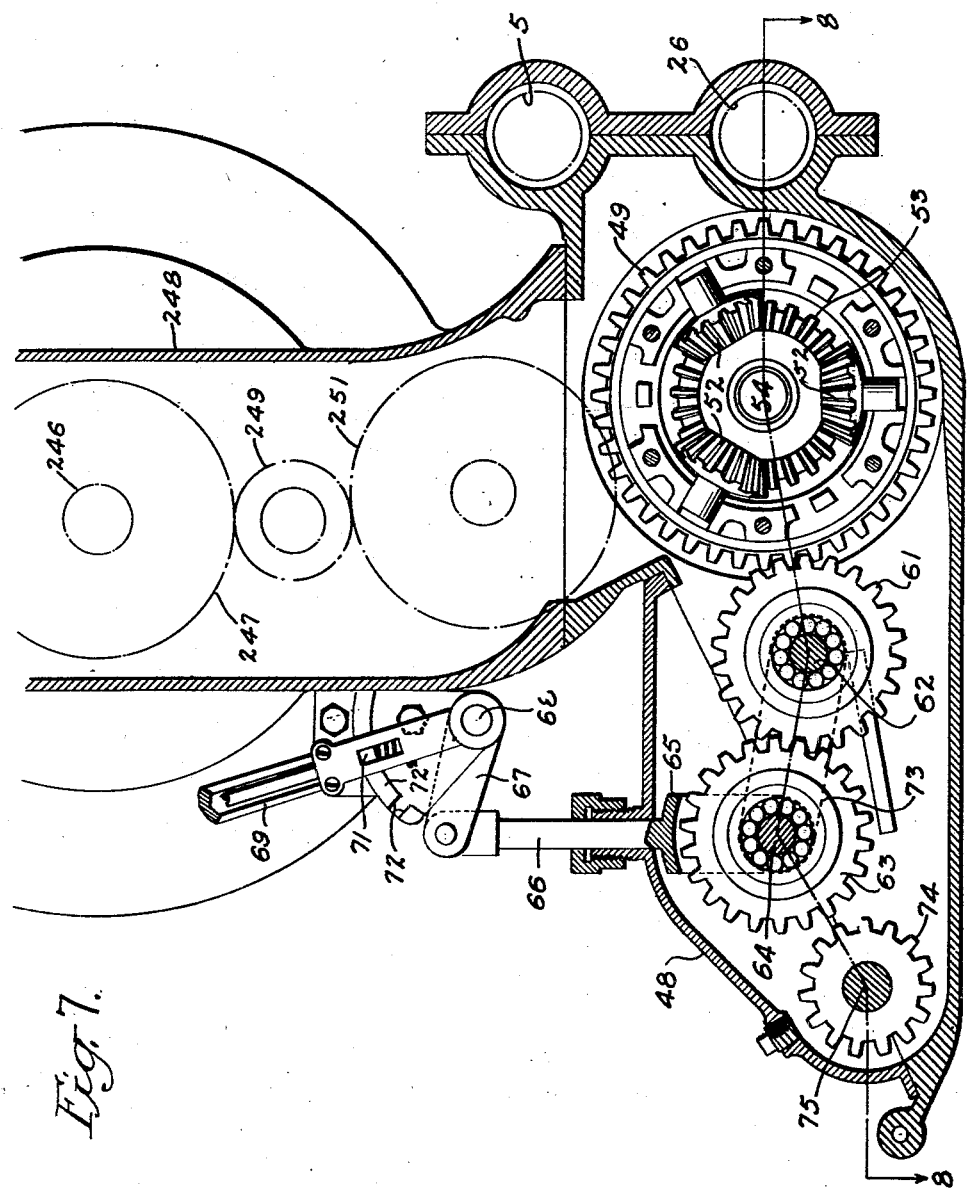

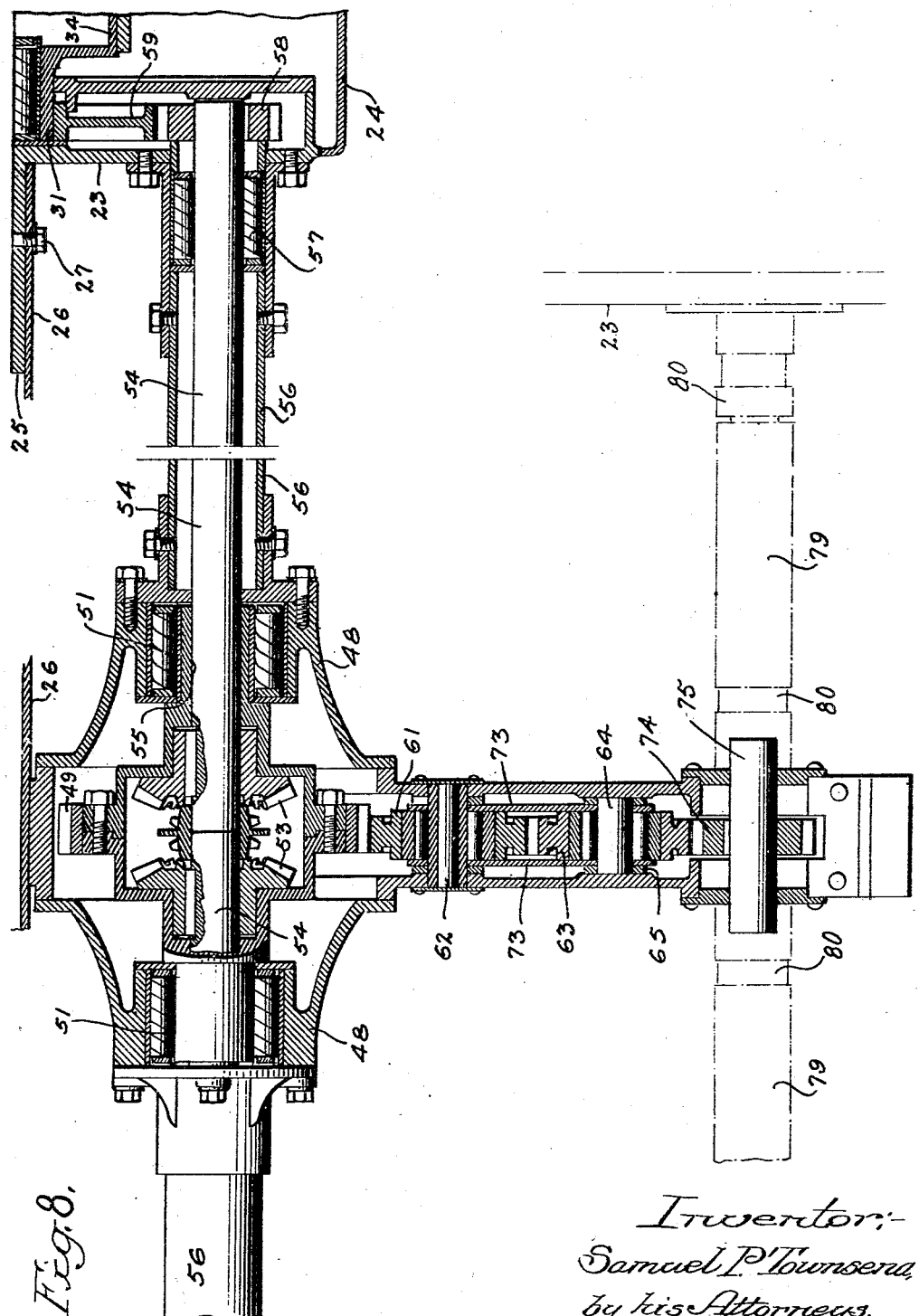

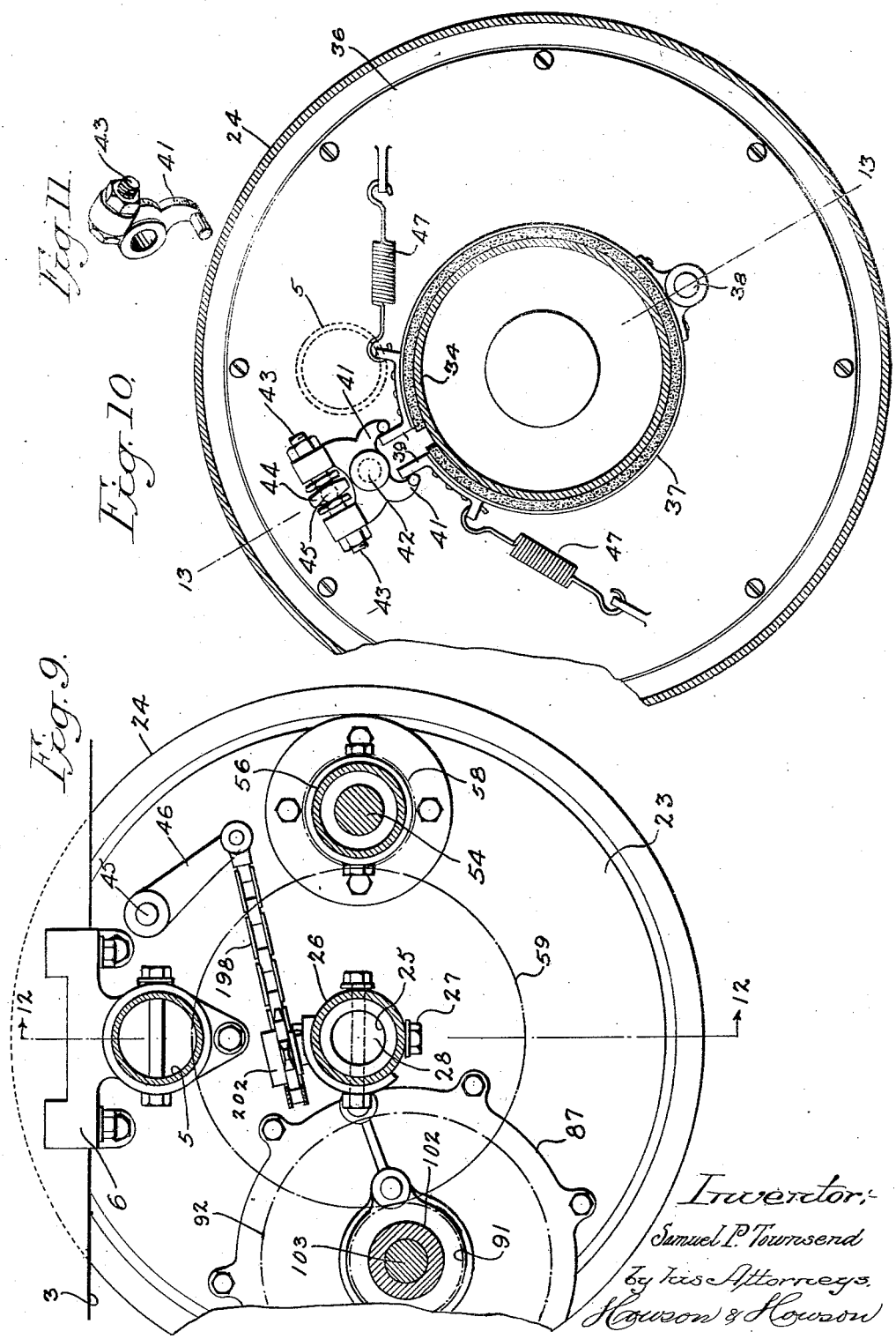

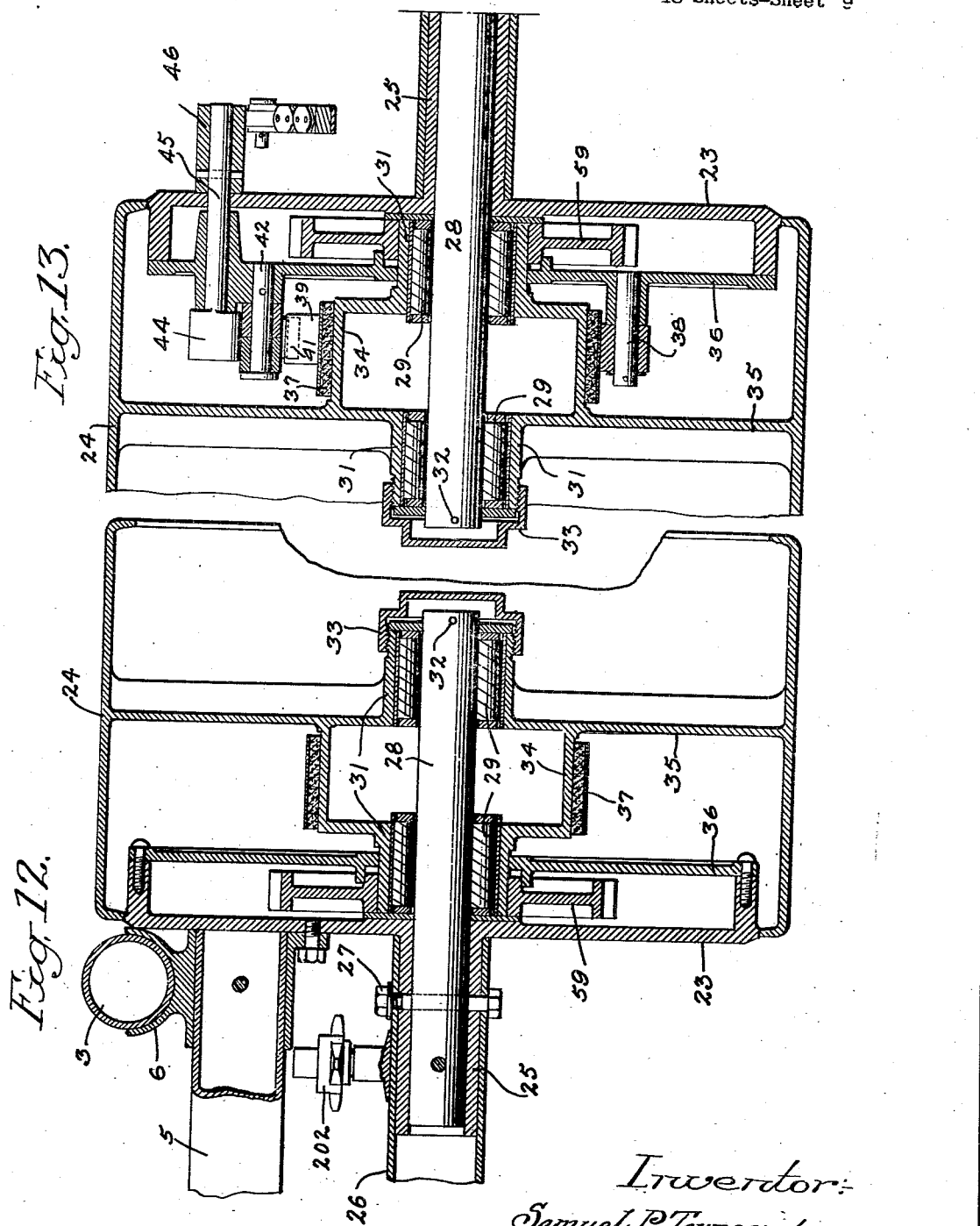

April 12, 1932.　　　S. P. TOWNSEND　　　1,853,244

LAWN MOWER

Filed Oct. 3, 1927　　　18 Sheets-Sheet 10

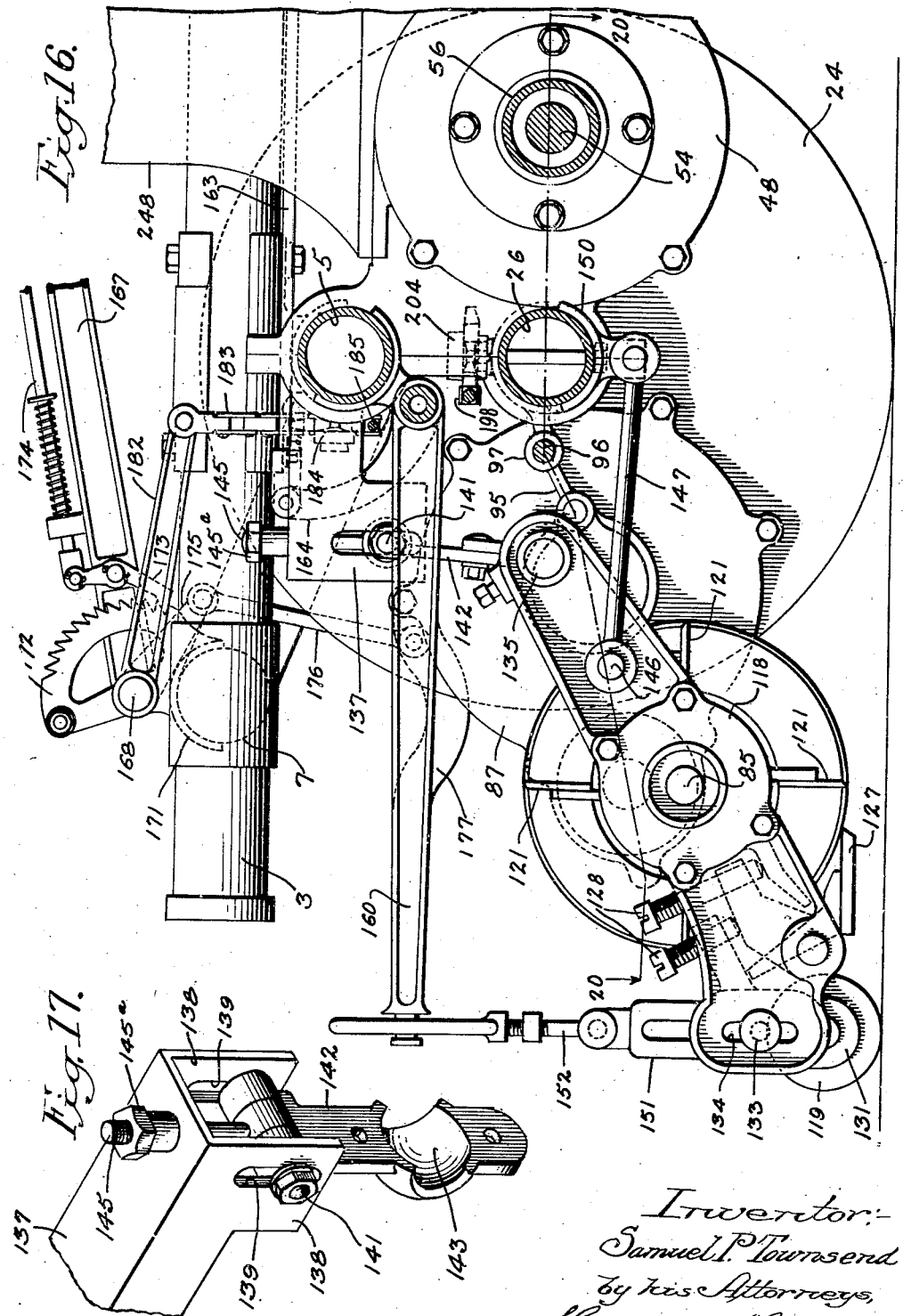

April 12, 1932.  S. P. TOWNSEND  1,853,244
LAWN MOWER
Filed Oct. 3, 1927  18 Sheets-Sheet 12
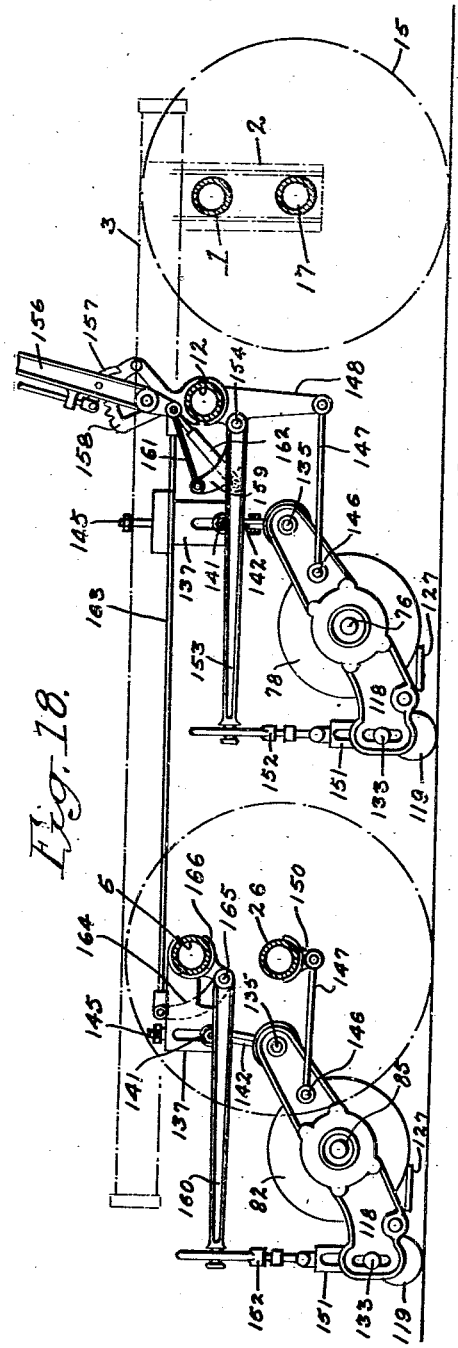
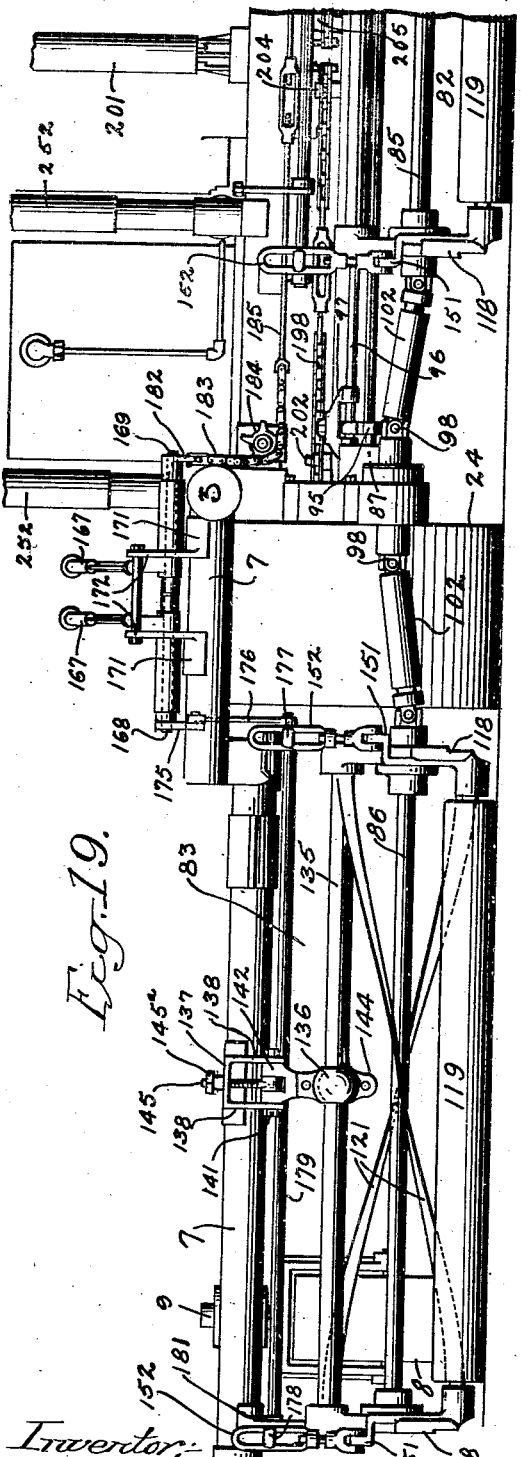
Inventor:
Samuel P. Townsend,
by his Attorneys Howson & Howson April 12, 1932.  S. P. TOWNSEND  1,853,244
LAWN MOWER
Filed Oct. 3, 1927  18 Sheets-Sheet 13
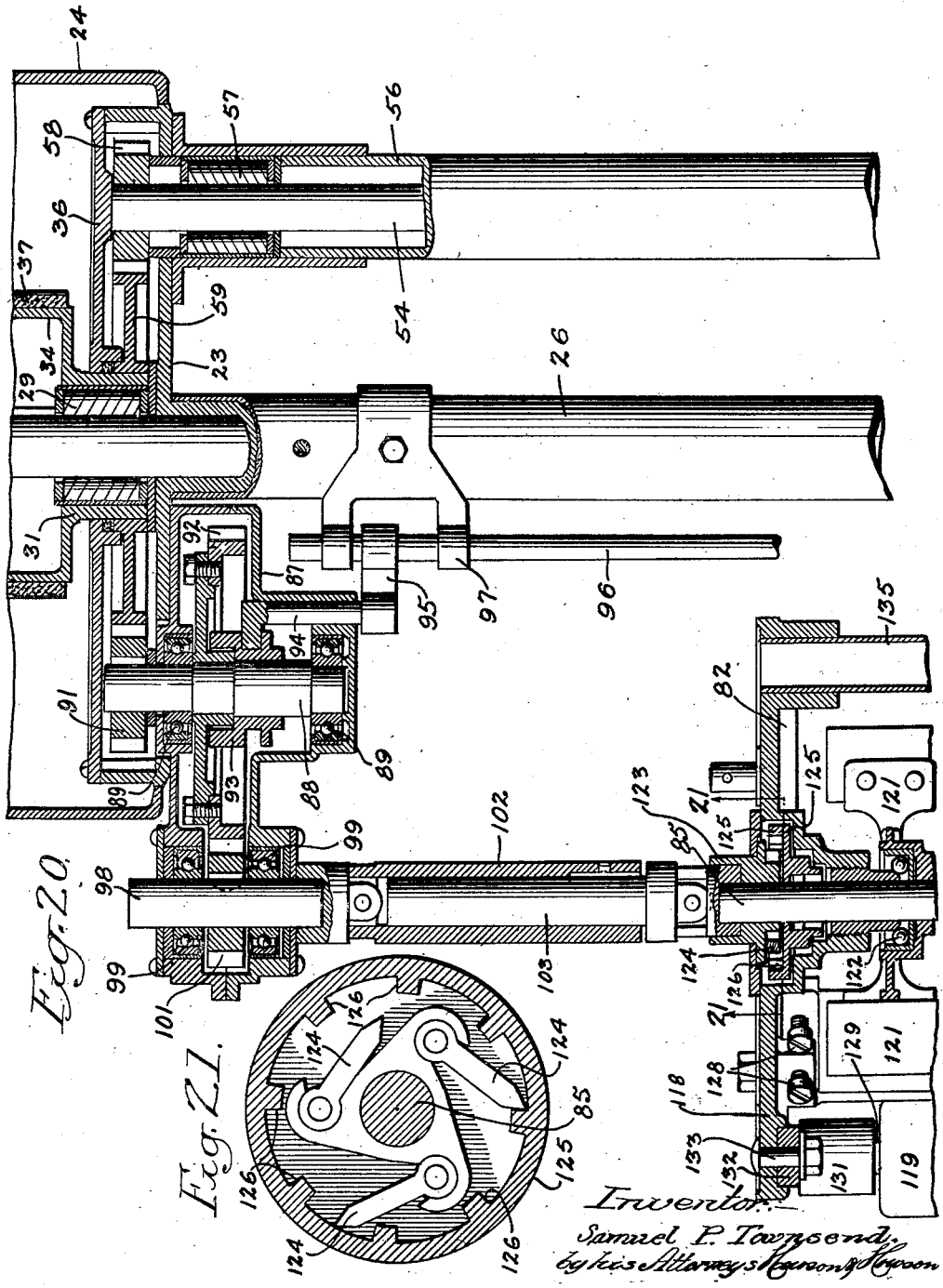

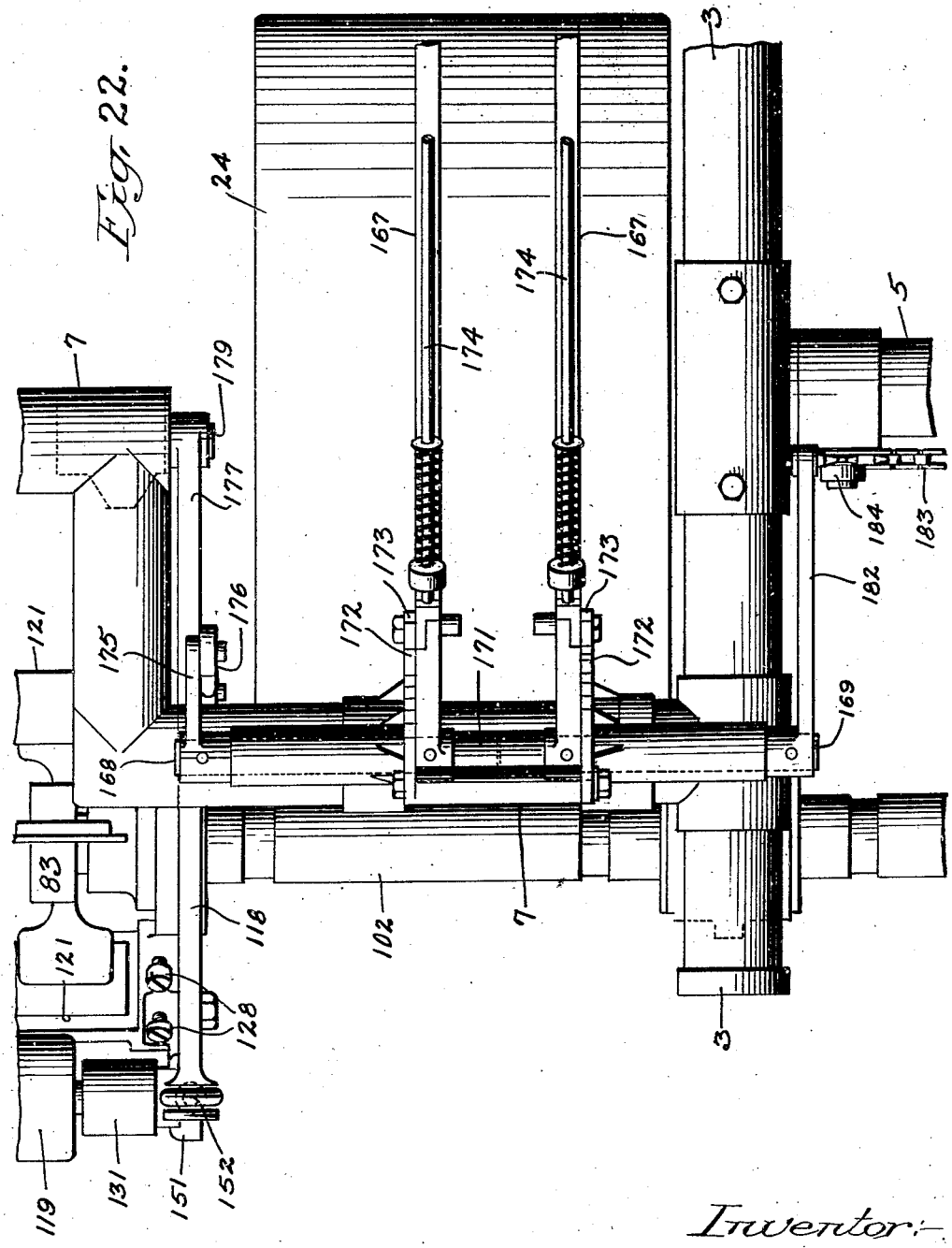

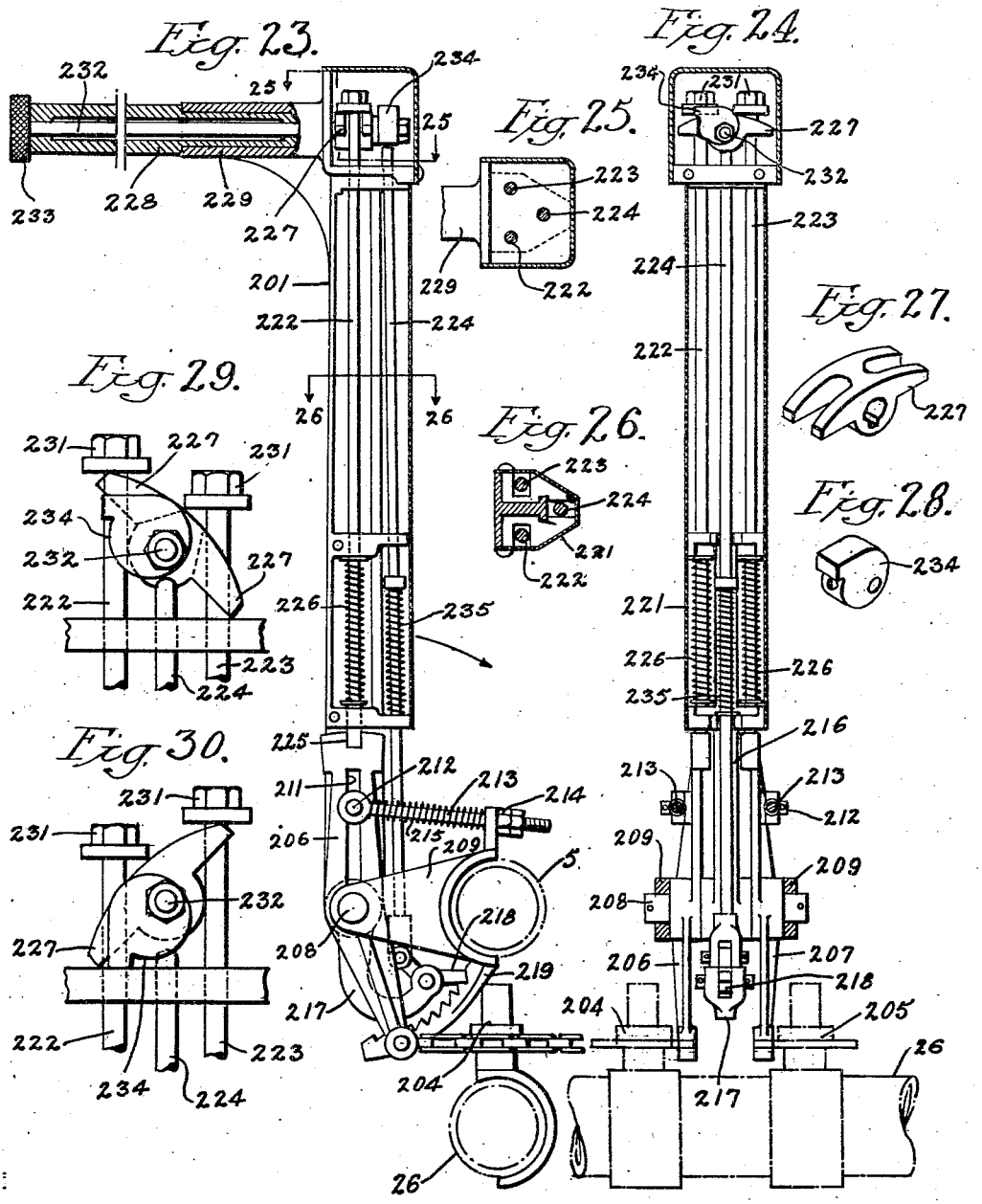

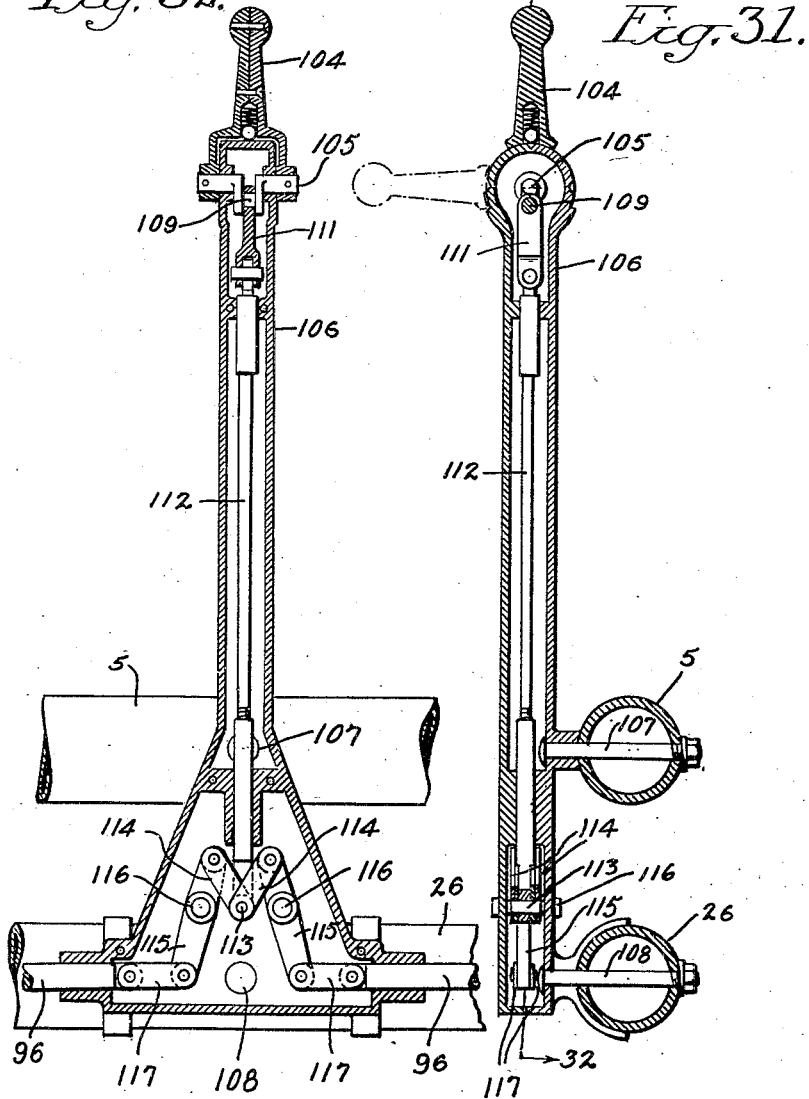

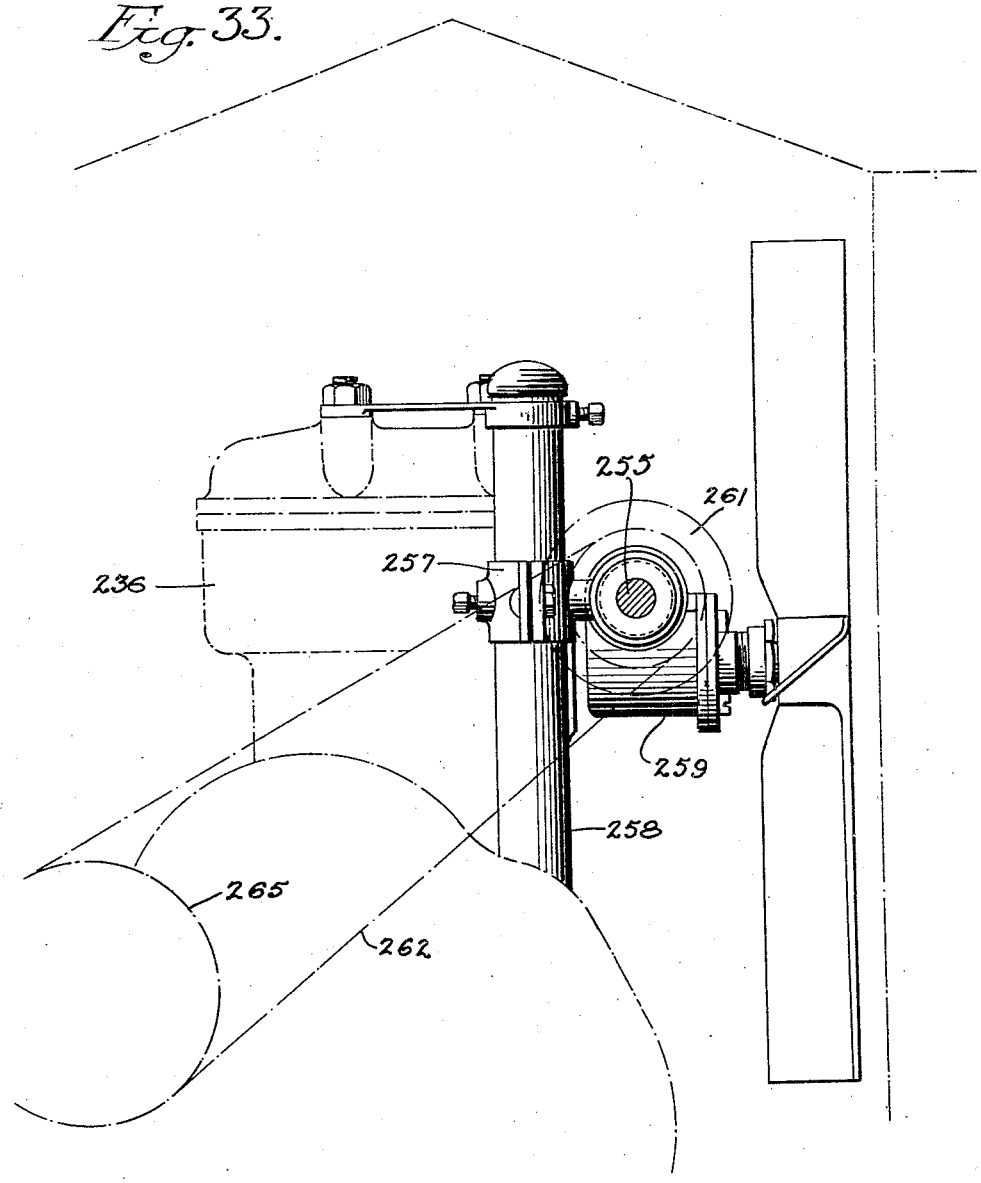

April 12, 1932.  S. P. TOWNSEND  1,853,244
LAWN MOWER
Filed Oct. 3, 1927  18 Sheets-Sheet 18
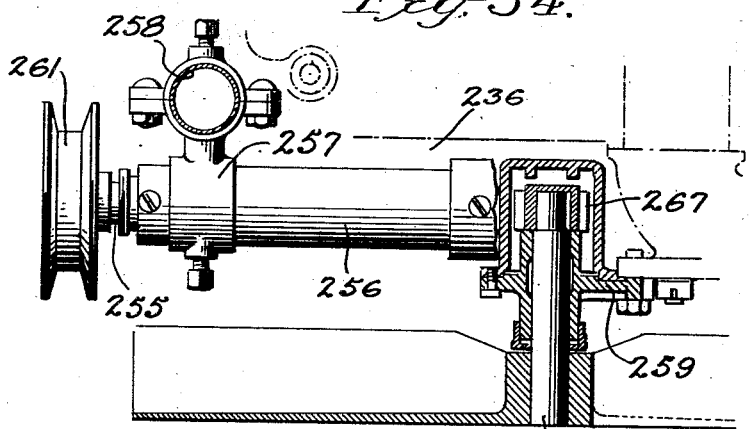
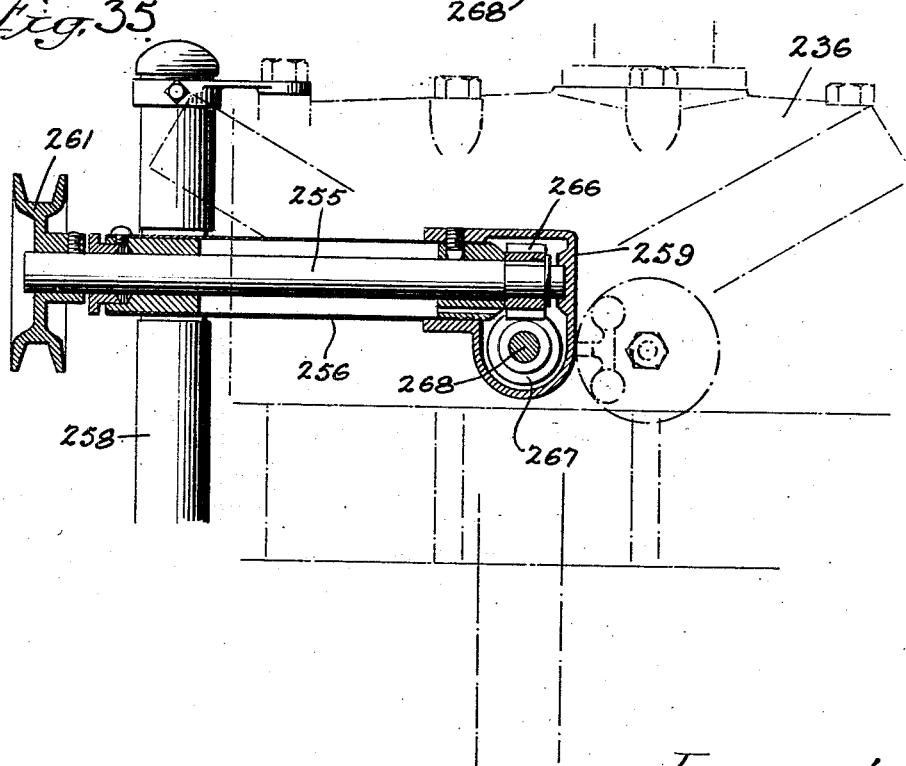

Patented Apr. 12, 1932

1,853,244

UNITED STATES PATENT OFFICE

SAMUEL P. TOWNSEND, OF BLOOMFIELD, NEW JERSEY

LAWN MOWER

Application filed October 3, 1927. Serial No. 223,680.

This invention relates to improvements in lawn mowers, and particularly in lawn mowers of the gang type employing a plurality of cutter units so arranged as to cut a continuous swath of predetermined width.

The principal object of the invention is to provide a novel and improved form of motor driven lawn mower of this type, and the invention resides in certain novel and improving structural and mechanical features hereinafter clearly set forth and specifically defined in the appended claims.

In the attached drawings:

Fig. 2 is an end elevation of the machine;

Fig. 3 is a fragmentary perspective view showing the frame;

Fig. 4 is a detached perspective of one of the frame piece connecting members;

Fig. 5 is a plan view of the frame and the cutting units with the superstructure including the engine removed;

Fig. 6 is a fragmentary sectional view showing the initial part of the transmission connecting the engine with the operating parts of the machine;

Fig. 6a is a sectional view on the line 6a—6a, Fig. 6;

Fig. 7 is a section on the line 7—7, Fig. 5;

Fig. 8 is a sectional plan view on the line 8—8, Fig. 7;

Fig. 9 is a section on the line 9—9, Fig. 5, showing details of the traction wheels;

Fig. 10 is a section on the line 10—10, Fig. 5;

Fig. 11 is a detached perspective of one of the clutch-actuating members;

Fig. 12 is a section on the line 12—12, Fig. 9;

Fig. 13 is a section on the line 13—13, Fig. 10;

Fig. 16 is a sectional view on the line 16—16, Fig. 5, showing one of the rear cutter units and associated parts;

Fig. 17 is a view in perspective showing a detail of the cutter unit suspension;

Fig. 18 is a diagrammatic side elevational view of the cutter units and the associated elevating mechanism;

Fig. 19 is an enlarged rear elevation of an end of the machine;

Fig. 20 is a section on the line 20—20, Fig. 16, showing details of the rear cutter unit driving mechanism;

Fig. 21 is a section on the line 21—21, Fig. 20;

Fig. 22 is a fragmentary plan view showing details of the rear cutter element elevating mechanism;

Fig. 23 is a fragmentary sectional view on the line 23—23, Fig. 1, showing details of the brake mechanism;

Fig. 24 is a front elevation partly in section of the parts shown in Fig. 23;

Fig. 25 is a section on the line 25—25, Fig. 23;

Fig. 26 is a section on the line 26—26, Fig. 23;

Figs. 27 and 28 are respectively detached views in perspective illustrating details of the brake-actuating mechanism;

Figs. 29 and 30 are respectively fragmentary elevations illustrating the operation of the brake-actuating mechanism;

Fig. 31 is a section on the line 31—31, Fig. 1, showing details of the clutch mechanism of the rear cutters;

Fig. 32 is a section on the line 32—32, Fig. 31;

Fig. 33 is a side elevation of the motor fan drive mechanism;

Fig. 34 is a plan view partly in section of the mechanism shown in Fig. 33, and

Fig. 35 is a front elevation partly in section of the fan drive.

Figure 1:
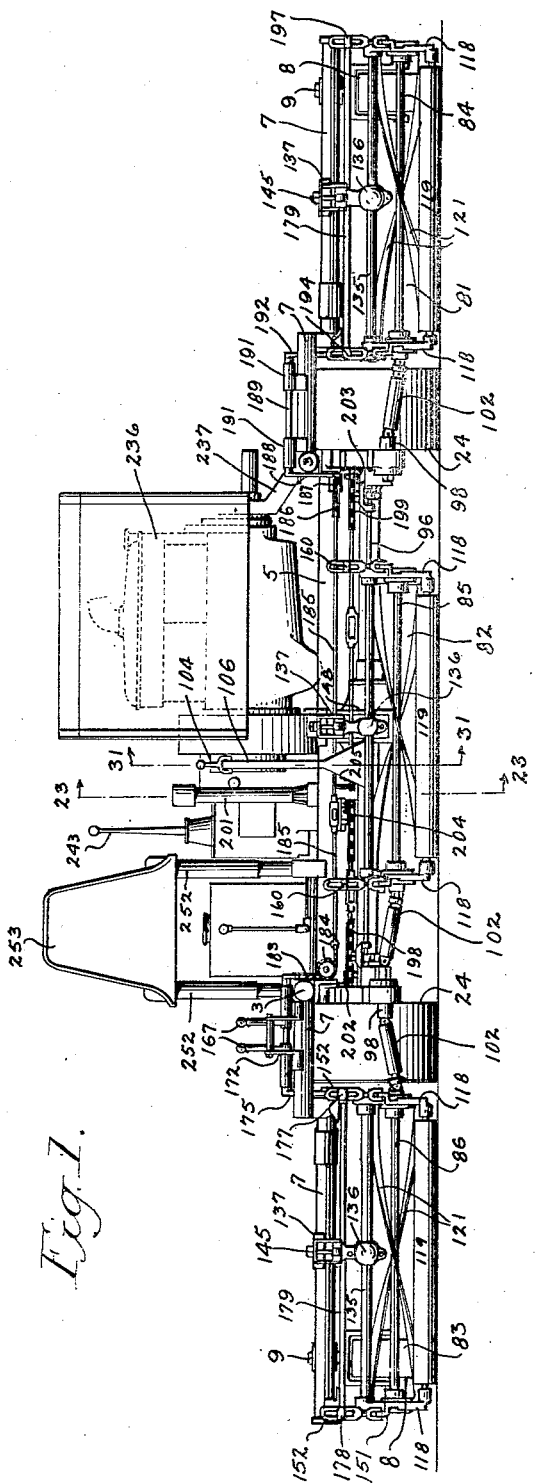
Figure 1 is a rear elevation of a machine made in accordance with my invention.

With particular reference to Figs. 1 to 4, inclusive, my machine in a preferred embodiment comprises a frame composed of cylindrical or tubular stock and consisting of a front cross bar 1 having at each end a bracket 2 to the tops of which are attached rearwardly extending side bars 3, 3. As best shown in Fig. 3, the brackets 2 have at their upper ends rearwardly extending saddle pieces 4 in which the forward ends of the side bars 3 rest and are secured. Connecting the side bars 3 adjacent their rear ends is a rear cross bar 5, this cross bar carrying saddles 6, see Fig. 4, in which the side bars rest and are secured. To the rear ends of the side bars 3 are pivotally secured for vertical movement side frame extensions 7 which project outwardly and are supported at their outer ends on wheels 8 journaled in yokes 9, which in turn are journaled for rotation about vertical axes in brackets 11 secured to the frame pieces 7. Secured to the under sides of the side bars 3 intermediate the ends thereof is an intermediate cross bar 12, the connection between this cross bar and the said side bars being accomplished through the medium of sockets 13 depending from the rear projecting ends of the saddles 4 through which the said cross bar 12 extends. Links or tie rods 14 form a flexible reinforcing connection between the frame extensions 7 and the ends of the cross bar 12.

The forward part of the frame is supported on wheels 15, 15, journaled on axles 16 which are pivotally secured to the ends of a transverse axle bar so as to be movable in each instance about a vertical axis. Each of the axle elements 16 has a rearwardly extending arm 18 which are interconnected by means of a rod 19, and this rod is connected through any desirable form of steering mechanism with a steering post 21, the lower end of which is supported in a bracket 22 on the cross bar 1.

Attached to each end of the cross bar 5 in the manner shown in Figs. 9 and 12 is a circular housing 23 which constitute respectively the inner end plates of a pair of wheels 24, 24 which with the wheels 8 support the rear of the frame. Referring to Fig. 12, it will be noted that each of the plates has a concentric cylindrical extension 25 which respectively fit and are secured in the ends of a tubular cross piece 26. Withing each of the tubular extensions 25 is secured by means in the present instance of a bolt 27 an axle pin 28 which projects through the housing 23 and on which are journaled the wheels 24. In each instance, a set of roller bearings 29 is provided which are interposed between the hub 31 of the wheels and the axle pin 28. The wheel in each instance is confined to its axle pin by a pin 32 inserted through the end of the axle 28, and in each instance also a hub cap 33 is provided which is threaded on the outer end of the hub 31.

Each of the wheels 24 which constitute the traction wheels of the machine is provided with a cylindrical part 34 which constitutes a brake drum, this drum being confined as shown in Figs. 12 and 13 between the web 35 of the wheel, of which in the present instance it forms an integral part, and a cover plate 36 secured to the inner end of the housing 23. Brakes are provided to cooperate with the drums 34 in the form for example of split bands 37 which are anchored to the cover plate 36 by means of pins 38 and which partially surround the drum, as shown in Fig. 10. At the pivoted ends of the bands 37 are a pair of lugs 39 whose outer faces are respectively engaged by a pair of levers 41, see Fig. 11, pivoted on a pin 42 secured in each instance to the cover plate 36 of the housing 23, the outer ends of the levers 41 each carrying a transversely adjustable bolt or screw 43, the inner ends of which bear against the opposite faces of a cam 44 carried at the inner end of a brake-operating shaft 45 which is journaled in and projects through the cover plate 36 in the housing 23 and which carries at its outer end a lever 46 by means of which this shaft may be rocked to apply the brakes. The brake band is normally held in a position retracted from the drum by a pair of springs 47, see Fig. 10, which are attached to the plate 36. The form of the levers 41 is best shown in the perspective view, Figure 11.

Figure 15:
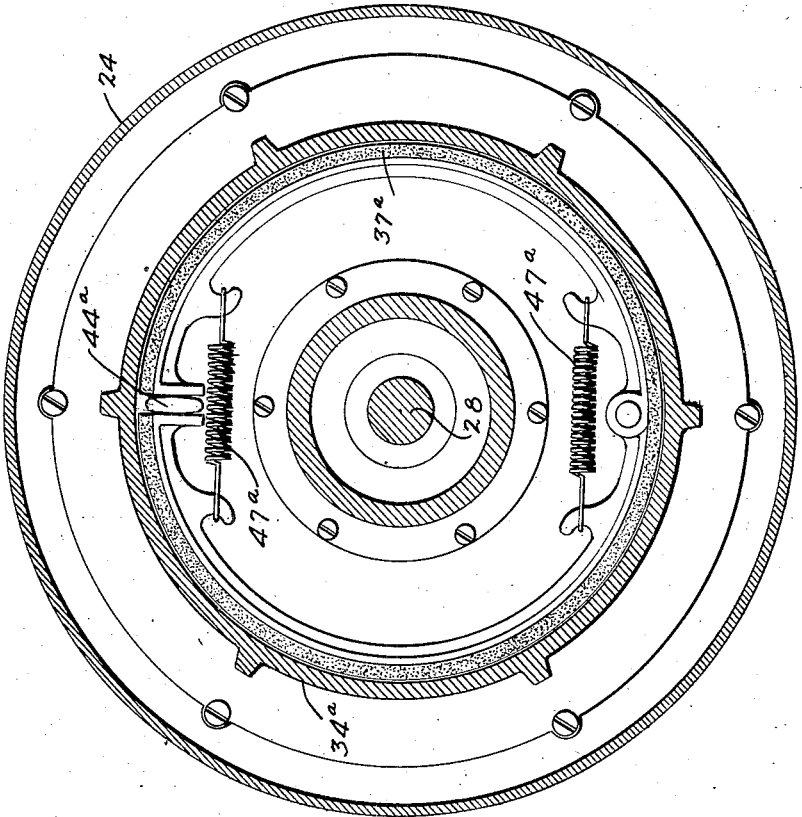
Fig. 15 is a section on the line 15—15, Fig. 14.
Figure 14:
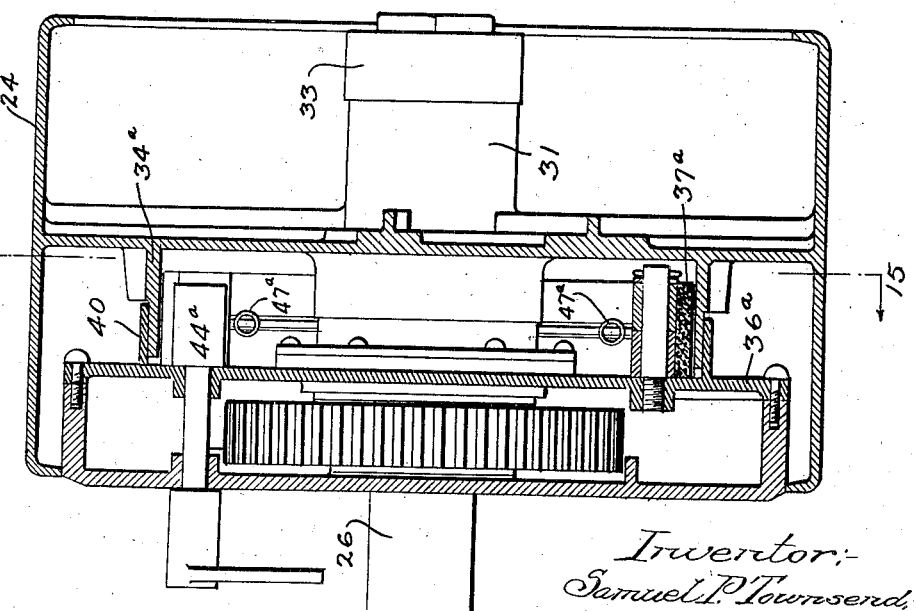
Fig. 14 is a section corresponding to that of Fig. 12 illustrating a modified form of brake.

In Figs. 14 and 15, I have shown a modification of the braking apparatus. In this instance, the brake drum 34a is enlarged and the housing inner plate 36a is provided with an annular flange 40 which closely surrounds the outer free edge of the drum. In this instance also I employ a brake shoe or band 37a of well known form which when spread or expanded by a cam 44a frictionally engages the inner surface of the drum. Springs 47a tend to retain the band in contracted condition.

Suspended from the cross bars 5, 12 and 26 intermediate the wheels 24 is a gear box 48 in which is housed transmission gearing including a differential. This differential, as shown in Figs. 7 and 8, comprises a main gear 49 which is journaled in bearings 51 in the housing and which carries three radially arranged bevel pinions 52 journaled in the gear and meshing with a pair of bevel gears 53 fixed to the abutting ends of a pair of shafts 54 which extend through the hollow journal portions 55 of the gear 49 and through tubular housings 56. One end of each of these housings 56 is connected to the housing 48, while the other ends are connected respectively to the end plates 23 of the wheels 24, as well shown in Fig. 8. The outer ends of the shafts 54 are supported in bearings 57 in the said housings 56, and upon the extremities of each of the shafts within the housings 23 is a pinion 58 which meshes with a gear 59 in the said housings 23, this gear being secured in each instance to the hub of the associated wheel 24.

Within the housing 48 and meshing with the gear 49 is a gear 61 which is journaled on a pin 62 extending transversely of the housing and which in turn meshes with a third gear 63 also mounted in the housing and journaled on a pin 64 supported in a vertically adjustable bracket 65. This bracket, as shown in Fig. 7, has a shaft 66 which extends upwardly through an opening in the housing and connects at its upper end with a lever arm 67 on a rock shaft 68 journaled in the engine frame, as hereinafter set forth, and capable of being rocked through the medium of a lever 69. This lever carries a spring-pressed pawl 71 which cooperates with notches 72 in a segment 72a to support the lever 67 and associated parts including the gear 63 in an elevated position, as shown in Fig. 7. Links 73 connect the pins 62 and 64 in which the gears 61 and 63 are journaled, and these links bind the pins 62 and 64 in their proper relative position. A fourth gear 74 is mounted in the casing on a shaft 75 to which this gear is secured, and is adapted to mesh with the gear 63 when the latter is in a depressed position, and under these circumstances a complete train of transmission is established between the gear 49 and the gear 74, which train is broken when the gear 63 is elevated, as shown in Fig. 7.

The shaft 75 is flexibly connected, as shown in Fig. 5, with the rotary cutter shafts 76 of a pair of lawn mower cutting units 77 and 78 of well known form which are connected with the frame in a manner hereinafter set forth. In the present instance, the flexible connection between the said shafts consists in each instance of an intermediate shaft section 79, as shown in Fig. 5, which is connected to the shafts 75 and 76 by universal joints 80. This provides, as hereinafter set forth, for free relative movement between the shafts 75 and 76, while maintaining the operative connection.

Attached to the rear of the frame in a manner hereinafter set forth are three cutting units 81, 82 and 83, which are so arranged transversely of the frame that the space therebetween is bridged by the forward cutting units 77 and 78. Each of these cutting units comprises a rotary cutter shaft 84, 85 and 86 respectively which are also operatively connected with the transmission mechanism described above. As shown in Fig. 20, each of the housing members 23 has secured to its inner face a housing 87 in which is mounted a shaft 88, this shaft being journaled in bearings 89 in the housing. The shaft projects into the housing 23 and carries at that end a pinion 91 which meshes with the gear 59. The shaft also carries within the housing 87 a gear 92, this gear being loosely mounted on the shaft and being operatively connected with the shaft when desired through the medium of a clutch one element of which is on the hub of the gear, while the other element, 93, is splined to the shaft. This element 93 may be shifted axially on the shaft to either engage or release the clutch by means of a rod 94 which projects through the housing and is connected by an arm 95 with a rod 96 slidably supported in a yoke 97 on the cross bar 26.

In the outer end of the housing 87 is mounted a shaft 98 journaled in bearings 99 in the housing and carrying a pinion 101 which meshes with the gear 92. This shaft 98 is flexibly connected in one instance with the shaft 84 of the cutting unit 81, and in the other instance with the shafts 85 and 86 of the cutting units 82 and 83. In each instance, the connection between the shaft 98 and the respective cutter shafts consists, as shown in Fig. 20, of a sleeve 102 having a universal joint connection with the shaft 98 and a shaft element 103 slidable within and splined to the sleeve 102 and having a universal joint connection with the cutter shaft. The intermediate shafts 79 which connect the shafts 75 and 76 also take this form of extensible link comprising the splined sleeve and shaft assembly described above.

As shown in Figs. 31 and 32, the rods 96 which control the clutch elements 93 connect with a clutch-operating handle 104 which is mounted on a shaft 105 journaled in the upper end of an upright casing 106 which as shown in Fig. 31 is secured by bolts 107 and 108 to the frame bars 5 and 26. The shaft 105 has a crank 109 to which is operatively connected through the medium of a connecting rod 111 a rod 112 which is slidably supported in the casing and which extends downwardly to connect with the mid point 113 of a toggle. This toggle consists of links 114 whose inner ends are pivotally connected together and to the rod 112, as stated, and whose outer ends are pivotally secured to the upper ends of levers 115, 115 respectively pivotally mounted at 116 in the casing. To the lower ends of the levers 115 and through the medium of links 117 are connected the ends of the rods 96. When the handle 104 is in the upright position as illustrated, it is apparent that the rods 96 are in the extended position, as shown in Figs. 20 and 32, so that the clutch element 93 is engaged with the gear 92. When the handle 104 is turned down into a horizontal position, as illustrated in broken lines in Fig. 31, the lower ends of the levers 115 are moved toward each other, with the result that the rods 96 are retracted, thereby withdrawing the clutch element 93 and releasing the clutch. Obviously the handle 104 controls the operative connection between the aforedescribed transmission mechanism and the shafts of each of the rear cutting units, the connection between the transmission and the cutter shafts of the forward units being controlled, as previously set forth, by the lever 69 through the medium of the adjustable gear 63.

The cutting units consist in the present instance of a pair of end plates 118 which as shown in Figs. 5, 16 and 20 normally occupy an inclined position and which carry at their lower rear ends a roller 119 which normally supports the unit in its proper relation with respect to the ground surface. In the end plates 118 is journaled the cutter shaft and the rotary cutter blades 121, as best illustrated in Fig. 20, which shows a ball bearing 122 interposed between an extension of the side plate 118 and the hub of the rotary blade assembly which is secured to the shaft 85. In the present instance, the connection between the flexible transmission shaft and the cutter shafts is through the medium of a ratchet clutch consisting of a driving element 123 which as shown in Fig. 21 carries three pivoted pawls 124, and a ratchet wheel 125 is provided having teeth 126 adapted to be operatively engaged by the pawls when the driving member is rotated in one direction, and to be inoperative with respect to the ratchet wheel 125 when the shaft is oppositely rotated. The ratchet wheel 125 is secured to the shaft 85 and the arrangement provides for the rotation of the shaft 85 and the cutter blade assembly 121 from the power source in one direction only.

With reference to Fig. 21, it will be noted that the pawls 124 are differentially arranged with respect to the teeth 126 so that but one pawl at a time is in operative engagement with the teeth, the others being so positioned that a minimum forward movement of the driving element after release of any one of the pawls will result in one or other of the pawls engaging one of the teeth 126. In the present instance eight teeth are provided, and with the three pawls arranged as shown, one twenty-fourth of a revolution of the driving element 123 results in bringing one of the pawls into engagement with one of the teeth regardless of the relative positions of the clutch elements.

The cutting units also comprise the usual cutter bar 127 which cooperates in well known manner with the cutting blades 121, and the usual means is provided in the form of set screws 128 for adjusting the bar 127 with respect to the blades.

It will be noted by reference to Fig. 20 that the roller 119 is journaled on a shaft or pin 129 supported in a bearing element 131 on a member 132 which is slidable vertically in the side plates, the element 132 being held in adjusted position by means of a bolt 133 which extends through a slot 134 in the lower rear extension of the said side plates, see Fig. 16. This device provides for the usual vertical adjustment of the roller 119 to vary the distance between the cutting elements and the ground surface.

The forward and upper ends of the side plates 118 are connected by a cross bar 135, the cross bar of each unit having at its mid point a spherical enlargement 136 constituting one element of a ball and socket joint by which each of the cutter units is connected with the frame. This part of the suspension consists of brackets 137, see Figs. 2 and 16 to 19, inclusive, secured to appropriate parts of the frame and each comprising two depending side plates 138 having vertical slots 139 in which is supported a bolt 141. This bolt constitutes a pivot pin for an arm 142 having at its lower end a semicircular recess or concavity 143 for reception of the sphere 136 on the cross bar 135 of the respective cutter units. A spherical clamping plate 144 is provided which is adapted to be secured by bolts to the arm 142 to clamp the spherical part 136 in the socket. It will be noted that the upper end of the arm 142 is bifurcated, leaving a space between the bifurcations for an adjusting bolt 145 having an opening at the lower end through which the bolt 141 extends and which itself extends upwardly through the bracket 137, and in the case of the forward units through the side piece 3 of the frame, and has on its upper projecting end a nut 145a by means of which the bolt 141 may be adjusted vertically in the slots 139. This device provides an extremely flexible connection affording free movement of the suspended units in conformity with the irregularities of the ground over which they are drawn.

The side plates 118 in each instance are provided with outwardly projecting pins 146, to each of which is connected a rod 147 which extends forwardly to a relatively fixed part of the machine, these rods constituting draft rods by means of which the units are drawn with the frame. In the case of the forward cutter units, see Fig. 18, the rods 147 are connected to arms 148 depending from the frame cross bar 12. The rods 147 connected to the two outer rear cutters attach, as shown in Fig. 2, to arms 149 depending from the frame offset 7, while the intermediate rear cutters, again see Fig. 18, are similarly connected through the aforesaid rods 147 with brackets 150 depending from the frame piece 26.

Means is also provided for elevating the individual cutter units into an inoperative suspended position. To the rear of each of the end plates 118 is attached an upstanding bracket 151 which has pivotally connected to the top thereof a link 152. In the case of the forward cutter units, see Fig. 18, these links 152 are connected with the rear end of levers 153 which are secured to shafts 154, 155, journaled in the arms 148 and operatively connected respectively with two of the three operating levers 156 pivotally mounted on the frame at the front of the machine as shown in Fig. 2. These levers 156 each carry a pawl 157 engaging in the teeth of a segment 158 to retain the lever in the retracted position in which the arms 153 are elevated to an extent lifting the rear ends of the cutter units from the ground. The usual means is provided on the levers 156 for releasing the pawl to permit the lowering of the units. The connection between the shaft 154 and its associated lever is made through an arm 159, see Fig. 18, on the end of the shaft which is connected with the bottom of the lever by a link 161. The other of the forward cutting units is connected with its elevating lever by a link 162 which extends between the lower end of the lever and one of the arms 153. The other of the three levers 156 is operatively connected with the rear center cutter unit through a rod 163 which extends rearwardly to an arm 164 on a transverse shaft 165 which is journaled in brackets 166 on the frame piece 5 and to which is secured the lever arms 160 of this unit. By means therefore of the three levers 156 either one or all of the two forward and the intermediate rear cutter units may be elevated to inoperative position.

The end cutter units at the rear are elevated by means of a pair of levers 167 mounted on one of the frame extensions 7, see Figs. 1, 16, 19 and 22. These levers are secured respectively to shafts 168, 169 journaled in brackets 171, and these brackets also carry a pair of toothed segments 172 which cooperate with pawls 173 on the respective levers to retain the latter in adjusted position. The pawls are actuable through rods 174 on the levers, in well known manner, to release the levers.

The shaft 168 carries at its outer end an arm 175 which is connected through a link 176 with a lifting lever 177 at the inner end of the cutter unit 83, this lever 177 and the corresponding lever 178 at the opposite end of the unit being fixed to a shaft 179 journaled in arms 181 depending from the frame extension 7, to the lower ends of which are secured the draft rods 147 of this unit. As shown in Fig. 16, the lever arm 177 is recessed in that part underlying the frame extension 7 so that the lever may be elevated to its full extent without interference from the frame. The outermost of the levers 167 accordingly provides means for elevating the cutter unit 83.

The shaft 169 carries at its outer end a lever arm 182, see Figs. 16 and 22, to whose extremity is attached a sprocket chain 183. This sprocket chain passes down and around a sprocket 184 secured to the frame and connects with a rod 185 which extends transversely across the machine to a second sprocket chain 186 which, after passing around a horizontal sprocket 187, attaches to the lower end of a depending arm 188 on a shaft 189 journaled in brackets 191 on the right frame extension 7, see Fig. 1. The shaft 189 has at its opposite end an arm 192 the outer end of which is connected by means of a link 193 with the inner lifting lever 194 of the cutter unit 81, see Fig. 2. This lever 194, which corresponds in form to the lever 177 described above, is secured to a shaft 195 journaled in the depending arms 149 on the shaft extension 7, to the lower ends of which are attached the draft rods 147 of this cutter unit. At its outer end, the shaft 195 carries the outer lifting lever 197, as shown in Fig. 2. The inner of the two levers 167 therefore controls the lifting of the cutter unit 81. It will be noted that each of the cutter units is provided with independent means including an operating lever for elevating the rear end of the unit to render it inoperative by elevating it above the normal operative position.

As previously described, the brakes on the wheels 24 are operated through the medium of levers 46, and these levers, as shown in Figs. 1 and 9, are connected through chains 198 and 199 with a brake-operating lever 201, the details of which are shown in Figs. 23 to 30, inclusive. The chains 198 and 199 pass around sprockets 202, 203, and after extending transversely pass around a second set of sprockets 204, 205, and connect to the lower ends of a pair of levers 206, 207, pivotally mounted on a pin 208 in a bracket 209 at the bottom of the lever 201 secured to the frame, as indicated. Each of the levers 206 and 207 is slotted longitudinally in their upper portions, as indicated at 211 in Fig. 23, and pins 212 adjustably secured in these slots function in each instance as a pivot for one end of a bolt 213 which passes through an opening in the bracket 209 and is provided with nuts 214 whereby it is secured in said bracket. Each of these bolts also carries a spring 215 which being interposed between the upper end of the associated lever arm 206 or 207, as the case may be, and the bracket 209, tends to retain the said levers in predetermined normal positions controlled by the position of the nuts 214 on the bolts. The lever 201 is also pivoted on the pin 208, this lever comprising a depending portion 216 which is journaled on the pin and which comprises an extension 217 below the pin which carries at its extremity a pivoted pawl 218 which is adapted to engage in the teeth of a segmental ratchet 219 on the bracket 209 to retain the lever in predetermined position. The lever 216 comprises in its upper portion a casing 221 in which are slidably mounted three rods 222, 223 and 224, as clearly illustrated.

The rods 222 and 223 are adapted to project at their lower exposed ends in notches 225 in the upper ends respectively of the levers 206 and 207, thereby to lock these levers to the operating lever 201. Each of the rods 222 and 223 is provided with a spring 226 which tends to hold the rods in a depressed position in which they occupy the said recesses 225. Either of these rods may be elevated by means of a cam 227 which is keyed to the inner end of a hollow shaft 228 journaled in the transversely extending upper portion 229 of the lever 201, see Fig. 23, and projecting into the upper end of the aforesaid casing 221, as shown in Figs. 29 and 30. Each of the rods 222 and 223 is provided at its upper end with a nut 231 which are engaged by opposite ends of the cam 227 so that when the shaft 228 is oscillated, one or other of the rods 222 or 223 is elevated, depending upon the direction of oscillation. By this means, either one of other of the rods may be elevated at will to release the associated lever 206 or 207.

Extending through the hollow shaft 228 is a second shaft 232 having secured at one end a knurled head 233 which lies against the outer end of the shaft 228 and which after extending through the cam 227 projects into the upper end of the lever 201 and has secured thereto a cam 234 which occupies a position directly above the upper end of the rod 224. By oscillating the shaft 232 through the head 233, the cam may be brought into contact with the upper end of the rod 224 to depress the latter against the tension of a spring 235, which normally retains this rod in an elevated position, as shown in Fig. 23, to thereby release the pawl 218 from the ratchet 219. With the pawl withdrawn from the ratchet, the entire lever 201 may be oscillated in the direction of the arrow, Fig. 23, carrying with it one or other, or both, of the levers 206 and 207. If both of these levers are carried forward, as will be the case if the rods 222 and 223 occupy the recesses 225, the brakes of both of the wheels 24 will be actuated. The independent control of the levers 206 and 207 provides, however, means for applying the brake of either of the wheels independently of the other, it being understood that when either of the rods 222 or 223 is elevated in the manner described so as to withdraw its lower end from the slot 225 of either of the levers 206 or 207, that lever when the actuating lever 201 is oscillated will remain in the normal position in which the brake is released, and the lever 201 accordingly will have no effect in its movement upon that brake.

Obviously, the pawl 218 functions not only to retain the lever in the brake-releasing position, but also holds the lever in the position in which the brakes are applied.

As shown in Figs. 1, 2, 3 and 7, a motor 236 is mounted on the frame, the motor being supported at one side by a bracket 237 on the frame and at the opposite side by the gear box 48. As shown in Fig. 6, the motor casing is extended to form housings for the fly wheel 238 with which is associated in well known manner any suitable form of clutch which may be actuated from a shaft 239 and a lever 241 on this shaft externally of the casing. The casing is further extended to form a housing 242 for the usual gear shift, a gear shift lever 243 of well known form being provided whereby the gears may be shifted as desired. The transmission is taken from the main or motor shaft 244 to a jack shaft 245 in the housing 242, and thence to a second jack shaft 246 which extends under the fly wheel 238, and has thereon a gear 247 which occupies a position over a depending part 248 of the casing, which as shown in Fig. 7 extends downwardly to seat upon the upper part of the gear box 48. Also as indicated in Fig. 7, the gear 247 is connected with the gear 49 of the differential through a pinion 249 and an intermediate gear 251, this completing the transmission train.

As shown in Figs. 1 and 3, the frame is provided at one side with four uprights 252 which support a seat 253 for the operator, this seat being situated properly and conveniently with relation to the driving wheel 254 and the various operating levers.

In Figs. 33 to 35, inclusive, I have illustrated the motor fan drive. This drive consists of a shaft 255 journaled in a housing 256 which is supported at one end by a bracket 257 secured to the breather pipe 258, and at the opposite end by a bearing bracket 259 secured to the engine casing. The shaft 255 has at one end a pulley 261 by means of which the shaft is operatively connected through a belt 262 with a second pulley 265 on the motor timing gear shaft. The inner end of the shaft 255 carries a helical gear 266 which meshes with a second helical gear 267 on the fan shaft 268. As shown in Fig. 34, this fan shaft is journaled in the bearing bracket 259.

It is believed that the general operation of the machine will be apparent from the foregoing description, and no detailed statement of operation will, therefore, be given. Attention is directed, however, to certain novel and useful structural details which go to make the present assembly a particularly desirable one. One of the principal problems in the construction of gang lawn mowers of this general type has been the distribution of weight of the motor and other operating parts. In the present instance, provision has been made to mount the engine transversely of the machine and with its crank shaft at right angles to the direction of movement, and by this means a more uniform distribution of weight on the frame has been obtained. It will further be noted that the engine is mounted in transverse alignment with the operator's seat and that the position of the engine and of the seat is not directly over the driving wheels but slightly in advance thereof and between these wheels and the forward frame-supporting or steering wheels. The arrangement provides that sufficient of the weight of these parts shall be on the front wheels to allow steering.

Attention is also directed to the aforedescribed arrangement whereby the brakes of the traction wheels may be individually applied. This method of brake control materially assists in the steering operation, in that the application of the brake to one of the traction wheels only has the effect of pivoting the entire machine around that wheel. This materially augments the normal steering arrangement and makes it possible to manipulate sharp corners at relatively high speeds. Material advantage is also realized in the arrangement whereby the cutting units may be elevated from the operator's seat by means of levers. A further novel and advantageous feature resides in the method of suspending the individual cutter units by means of a swinging link and ball and socket connection.

Particular attention is directed towards the method of drawing the cutter units from the frame. It will be noted that the draft rods are connected to the end plates of the mower at such a point, namely,—below the ball and socket suspension, that the draft has the effect of retaining the mower unit on the ground so that it cannot raise, the draft being such as to hold the supporting roller on the ground surface. The method of driving the rear units from the main gear through the medium of the auxiliary gears in a gear box secured to the side frames or housings of the wheels is also noteworthy.

It will be understood that there may be considerable modification in the various details without departure from the invention.

I claim:

1. In a lawn mower, the combination with a frame, of wheels journaled in and supporting said frame, a plurality of cutter units attached to the frame, a gear box mounted on the frame, gears in said box, transmission mechanism extending from said gears to at least one of said wheels and to the said cutter units, and means including said gear box for supporting a motor on the frame for operative connection through the said gears with the traction wheel and the cutter units.

2. In a lawn mower, the combination with a frame, of wheels journaled in and supporting said frame, a plurality of cutter units attached to the frame, a motor carried by the frame, housings attached to two of said frame-supporting wheels, mechanism in said housings for operating said wheels, transmission means connecting said mechanisms with the motor, gear boxes secured to said housings, gears in said boxes operatively connected with said wheel driving mechanisms and also operatively connected with certain of said cutter units, and means independent of said housings for connecting the others of said cutter units with the motor.

3. In a lawn mower, the combination with a main frame, of wheels journaled in and supporting said frame, a plurality of cutter units flexibly connected with said main frame, a frame extension on opposite sides of and connected for vertical pivotal movement with respect to said main frame, a wheel supporting the outer ends of each of said sub-frames, a cutter unit flexibly connected to each of said sub-frames, a motor mounted on the frame, and transmisison mechanism operatively and flexibly connecting the cutter units with the motor.

4. In a lawn mower, the combination with a main frame, of a plurality of cutter units each comprising side frames connected by a transverse bar, means for suspending the said cutter units from the main frame comprising depending elements hinged to the main frame for pivotal movement in a vertical plane corresponding to the direction of movement of said frame, a ball and socket connection between said depending elements and the cross bars of the individual cutter units, rollers secured in the side frames of and normally supporting the rear ends of said units, draft bars connecting the cutter units to the main frame, a motor mounted on the frame and constituting means for propelling the latter, and a flexible connection between the motor and said cutter units.

5. In a lawn mower, the combination with a main frame, of wheels supporting said frame, a motor mounted on the frame and constituting the means for propelling the latter, a plurality of cutter units, links pivotally secured to the frame on transverse pivots and having a swivel connection with the individual cutter units, draft bars connecting the cutter units with the frame independent of the suspension, and means for operatively connecting the cutter units with the motor.

6. A lawn mower comprising a wheel-supported main frame, a cutter unit comprising a frame flexibly suspended at its forward end from the said main frame, a roller supporting the lower rear end of the cutter unit frame, and draft bars connecting the cutter frame with the main frame and attached to the former at points intermediate the roller and the point of suspension from the main frame whereby the draft bars exert a force in operation tending to retain the roller on the ground.

7. In a lawn mower, the combination with a wheel-supported main frame, of means for propelling said frame, a cutter unit comprising a frame flexibly suspended at its forward end from the main frame, a roller supporting the rear and lower end of the cutter frame, and draft means connecting the cutter frame with the main frame independent of said flexible suspension and adapted in operation to exert a force tending to prevent elevation of the rear or roller-supported end of said cutter frame.

8. In a lawn mower, the combination with a wheel-supported main frame, of mechanism for propelling said frame, a cutter unit comprising a frame including at one end a transverse cross bar and at the other a supporting roller, means for flexibly suspending the cutter frame from the main frame including a bracket swivelly connected to said cutter frame cross bar and normally supporting the said cross bar in an elevated position, and draft means connecting the cutter frame with the main frame independent of said suspension and connected to the sides of said cutter frame at points intermediate the cross bar and the said roller and exerting a force in operation tending to prevent elevation of the rear or roller-supported end of the cutter frame.

9. In a lawn mower, the combination with a wheel-supported main frame, of a plurality of cutter units attached to said frame, a motor mounted on the frame and operatively connected with said units and with one set of said wheels, brakes for said wheels, and control means for independently or simultaneously applying the brakes.

10. In a lawn mower, the combination with a main frame, of a pair of wheels supporting the front of said frame, a second pair of wheels supporting the rear of said frame, a plurality of cutter units attached to said frame, a motor carried by the frame and operatively connected with said units, means for operatively connecting the motor with one of said sets of frame-supporting wheels, brakes for said wheels, and means including a single operating lever controlling the application of said brakes and whereby the brakes of the wheels may be applied simultaneously or one at a time and selectively.

11. In a lawn mower, the combination with a wheel-supported main frame, of a plurality of cutter units attached to said frame, a motor mounted on the frame and operatively connected with at least one of said wheels, transmission mechanism operatively connecting the motor with the individual cutter units, a main clutch controlling the connection between the transmission and the motor, and an independent clutch controlling the connection between each of said cutter units and the motor.

12. In a lawn mower, the combination with a wheel-supported main frame, of a plurality of cutter units arranged transversely of the frame in two rows, with the units of one row bridging the space between the units of the other row, a motor carried by the frame and operatively connected with the said units, a clutch controlling the connection of each of said units with the motor, means for actuating the clutches of the units of one row, and independent means for operating the clutches of the units of the other row.

SAMUEL P. TOWNSEND.